United States Patent [19]
Turolla

[11] 3,716,245
[45] Feb. 13, 1973

[54] RING SEAL

[76] Inventor: Marco Turolla, 213, Via Toscana, Bologna, Italy

[22] Filed: March 4, 1970

[21] Appl. No.: 16,408

[30] Foreign Application Priority Data

March 10, 1969 Italy.................................6862 A/69
March 29, 1969 Italy.................................6914 A/69
May 8, 1969 Italy.................................7009 A/69
Feb. 14, 1970 Italy...............................12477 A/70

[52] U.S. Cl. ......................277/176, 277/70, 277/59, 277/188
[51] Int. Cl............................F16j 9/06, F16j 15/00
[58] Field of Search..........277/188, 70, 176, 177, 59, 277/79, 185

[56] References Cited

UNITED STATES PATENTS

| 2,462,586 | 2/1949 | Whittingham.......................277/188 |
| 2,616,731 | 11/1952 | Osmon................................277/188 |
| 2,739,855 | 3/1956 | Bruning..............................277/188 |
| 3,085,628 | 4/1963 | Malone.............................277/188 X |
| 3,097,855 | 7/1963 | Allen..................................277/188 |
| 3,166,832 | 1/1965 | Scannell..........................277/188 X |
| 3,218,087 | 11/1965 | Hallesy............................277/188 X |
| 3,362,720 | 1/1968 | Henry et al.......................277/188 X |
| 3,430,990 | 3/1969 | Nelson..............................277/188 X |
| 3,525,530 | 8/1970 | Bauer et al. ....................277/188 X |
| 3,269,737 | 8/1966 | Freese................................277/59 |
| 3,223,427 | 12/1965 | Gerard et al. ........................277/176 |
| 3,036,846 | 5/1962 | Peras..................................285/106 |

FOREIGN PATENTS OR APPLICATIONS

| 905,737 | 12/1945 | France.............................277/188 |
| 923,013 | 4/1963 | Great Britain..................277/176 |

Primary Examiner—Samuel B. Rothberg
Attorney—Richard Wiener

[57] ABSTRACT

In a ring seal for effecting a seal between two opposed sealing faces, which may be plane or curved faces, one of the sealing faces is provided with a groove the opening from which faces the other of the sealing faces. In the groove there are located an annular rubber-elastic sealing element which is compressively pre-loaded and a locating element made of a material harder than that of the sealing element. On compression of the sealing element to a predetermined degree above that of the pre-load the sealing element urges the locking element partly out of the groove to abut the sealing face opposite the opening from the groove.

5 Claims, 6 Drawing Figures

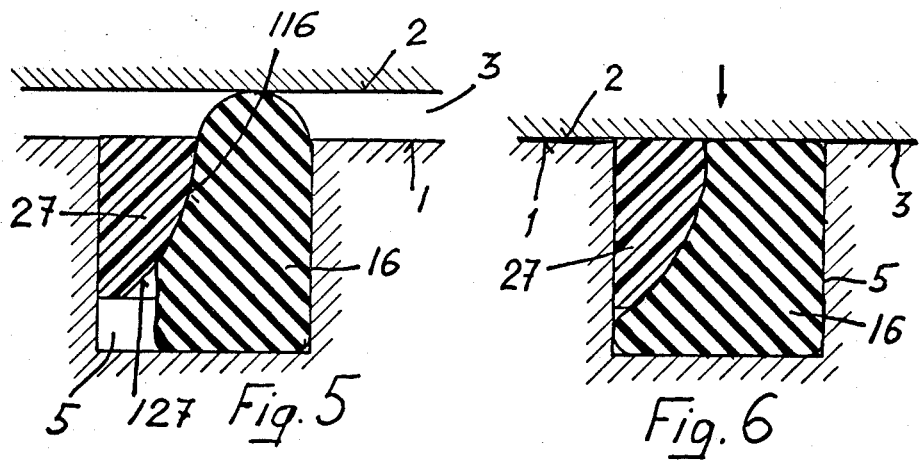

RING SEAL

BACKGROUND OF THE INVENTION

1. Field of the Invention

This invention relates to a ring seal for effecting a seal between two opposed sealing faces one of which is provided with a groove having an opening facing the other and in which there is located a rubber-elastic element of annular shape which is pressed against a sealing face facing said opening.

2. Description of the prior art

Known ring seals of the above-mentioned kind have the disadvantage that, under higher pressures of a fluid to be sealed or under more powerful mechanical compression of the rubber-elastic sealing element caused by relative displacements and/or deformations of the machine elements or sealing faces co-operating with the sealing element, the rubber-elastic sealing element is partially squeezed into the gap between the two sealing faces and is damaged or destroyed as a result. This difficulty arises in particular in the case of gear pumps, which are intended for high pressures, e.g. above 200 atmospheres, and in which the seal between a stationary sealing face, e.g. the pump case cover, and a mating sealing face limitedly displaceable and/or deformable with respect to the pump case cover, e.g. a bearing plate receiving the gear wheel pivot, must be assured. The "squeezing away" of the rubber-elastic sealing element into the gap separating the two sealing faces caused by the interplay of the pressure and the width of the gap, substantially restricts the operating pressure of the gear pump and the service life of the seals. Similar drawbacks arise during application of the said ring seals to other forms of machine.

It is an object of the present invention to eliminate or greatly to reduce the said disadvantages and to create a ring seal of the kind above-mentioned in which, at a relatively low cost, the squeezing of the rubber-elastic sealing element into the gap between the sealing faces is reliably prevented, without impeding or disturbing the freedom of mutual displacement or deformation of the sealing faces, i.e. the limited change in the width of the gap between the sealing faces and the freedom of displacement or deformation of other machine elements acting on the sealing element, establishing the freedom between sealing faces displaced, particularly sealing faces which are rotated relative to each other, without initial or "breakaway" frictional resistance between them.

SUMMARY

According to the invention there is provided a ring seal for effecting a seal between two opposed sealing faces one of which is provided with a groove having an opening facing the other, comprising an annular rubber-elastic sealing element located in said groove and engaging each of said sealing faces under an initial compressive pre-loading, and at least one annular locking element made of material harder than that of the sealing element, said locking element(s) being so located in the groove as to be disengaged from the sealing face facing said opening when the sealing element is subject only to said compressive pre-loading and to be guided by a part of the groove for movement relative to said opening by pressure applied thereto by the sealing element when the sealing element is compressively loaded to a predetermined degree in excess of the pre-loading thereof thereby to urge the locking element into abutment with the sealing face facing said opening.

With a ring seal as just set forth the annular locking element does not come into contact with the mating sealing face when the sealing element is not squeezed, i.e. when this rubber-elastic sealing element is acted upon only by the initial pre-loading, and consequently allows of unimpeded displacement of the two sealing faces towards and away from each other, i.e. the free limited variation of the gap width between the sealing faces, whereas in the case of sealing faces rotatable relative to each other, it does not cause any initial or "breakaway" frictional resistance. When the rubber-elastic sealing element is squeezed and deformed to a definite degree beyond the initial pre-loading thereof by the pressure of fluid to be sealed off and/or by an increased mechanical pressure, e.g. owing to a reduction in the width of the separating gap between the two sealing faces or under the action of another displaceable or deformable machine element, it automatically forces the harder locking element partly out of the groove owing to co-operation between the locking element and the sealing element, to an extent such that the locking element comes into contact with the sealing face opposite the opening from the groove. The locking element thereby closes the separating gap between the sealing faces at the other side of the sealing element from that of the pressurized fluid to be sealed off, and prevents the sealing element from being squeezed into the separating gap. After the mechanical and/or hydraulic or pneumatic pressure on the rubber-elastic sealing element has dropped, the latter again assumes its initial shape and position free of compression otherwise than that determined by its initial pre-loading, and renders it possible for the locking element to be freed from the mating sealing face and retracted into the groove.

BRIEF DESCRIPTION OF THE DRAWINGS

FIGS. 5 and 6 show another embodiment of ring seal between plane parallel sealing faces, the seal being formed by an annular profiled sealing element and a wedge-shaped locking element, the sealing element being shown uncompressed in FIG. 5 and in FIG. 6 mechanically compressed.

DESCRIPTION OF THE PREFERRED EMBODIMENT

Figure 1:
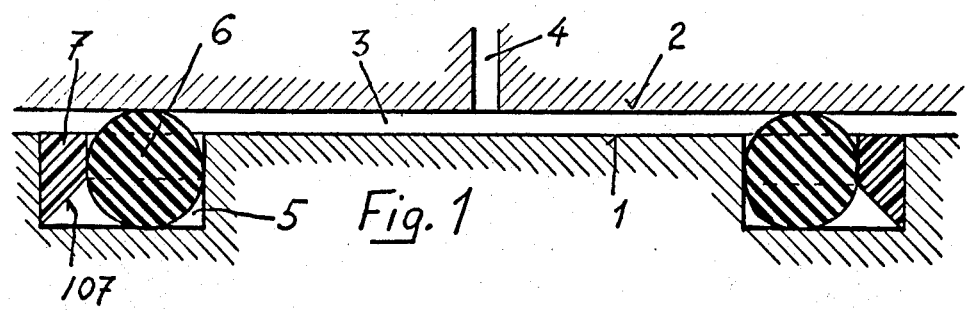
FIGS. 1 and 2 show a ring seal between plane parallel sealing faces, the seal being formed by an annular sealing element of circular section and a wedge-shaped locking element, the sealing element being shown uncompressed in FIG. 1, and in FIG. 2 compressed by the pressure of fluid to be sealed off.

In FIGS. 1 to 10, the numerals 1 and 2 indicate two plane parallel sealing faces which are separated from each other by a gap 3. The sealing face 1 may consist, for example, of the inner surface of the cover of a gear pump, whereas the mating sealing face 2 represents the outer surface of a bearing plate situated in the pump casing and receiving the gear wheel spindles. The pressurized hydraulic or pneumatic fluid penetrates into the separating gap 3 between the sealing faces 1 and 2 through an ingress opening or bore 4 which is illustrated only in FIGS. 1 to 4. Around the ingress opening 4 for the pressurized fluid is interposed between the sealing faces 1, 2 a ring seal which is disposed in an annular groove 5, FIGS. 1 to 6, in the sealing face 1. FIGS. 5 and 6 illustrate only the left-hand side cross-section of the annular groove 5, so that the part of the separating gap 3 acted upon by the pressurized fluid and to be sealed off is situated at the right-hand side.

The ring seal consists of an annular sealing element 6 (FIGS. 1 to 4) and 16 (FIGS. 5 and 6) of rubber-elastic material, and of an annular locking element 7, FIGS. 1 to 4, 17, FIGS. 3 and 4, 27, (FIGS. 5 and 6), of harder material, e.g. of hard rubber, leather, metal or synthetic material such as Teflon, nylon or the like. The rubber-elastic sealing element 6 or 16 is situated in the groove 5 appropriate, of the sealing face 1 and has a height such that it projects partially out of the groove. During assembly, a slight pressure is applied to the sealing element 6 or 16, as appropriate, between the base of the groove and the mating face 2. The harder locking element 7, 17 or 27 is also arranged in the groove 5 at the side of the sealing element remote from the ingress opening 4 for the pressurized fluid to be sealed off. The locking element has a height which is preferably approximately equal to the depth of the groove 5, or which is slightly less than the depth of the groove. The locking element 7, 17 or 27 is guided by a side of the groove 5 which is at right angles to the sealing faces 1, 2 for movement towards and away from the bottom of the groove 5.

Figure 2:
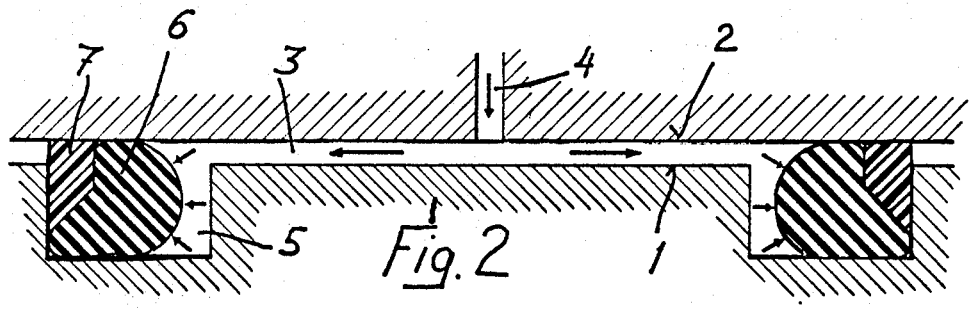

In the embodiment according to FIGS. 1 and 2, the groove 5 in the sealing face 1 has a rectangular cross-section. The rubber-elastic sealing element 6 is annular and of circular section. The cross-section of the harder locking element 7 has the shape of a right-angle trapezium whereof the longer parallel side is displaceably arranged in contact with the outer side wall of the groove 5. The side of the trapezoidal locking element cross-section extending at right angles to the parallel sides faces towards the mating sealing face 2 whereas the other side of the trapezium which faces towards the base of the grooveand which slopes relative to the parallel sides forms an oblique surface 107. The locking element 7 accordingly has a wedge-like shape in cross-section, tapering down in the direction towards the base of the seal receiving groove 6, and oblique surface 107 faces towards the sealing element 6.

When the sealing element 6 is uncompressed, i.e. acted upon only by pre-loading, as shown in FIG. 1, the locking element 7 is fully retracted into the groove 6 and is not in close contact with the mating sealing face 2. The sealing element 6 is acted upon by pressurized fluid penetrating into the gap 3 between the sealing faces 1 and 2, and when the pressure of the fluid reaches a predetermined value, the sealing element 6 is pressed against the locking element 7, and is squeezed and deformed as illustrated in FIG. 2. The sealing element 6 then exerts a pressure on the oblique surface 107 of the locking element 7 and urges the locking element 7 partially out of the receiving groove 5 and into engagement with the mating sealing face 2. Consequently, the locking element 7 seals off the separating gap 3 between the sealing faces 1, 2 at the other side of the sealing element 6 remote from the pressurized fluid to be sealed off, and thereby prevents the sealing element 6 from being squeezed into the separating gap 3 between the sealing faces 1, 2.

Figure 3:
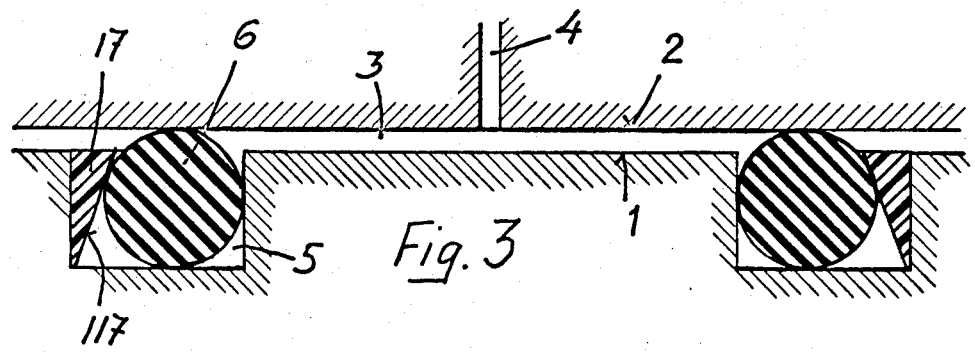
FIGS. 3 and 4 show a modified embodiment of the ring seal according to FIGS. 1 and 2, the sealing element being shown uncompressed in FIG. 3 and in FIG. 4 compressed by mechanical pressure caused by reduction of the separating gap between the sealing faces.
Figure 4:
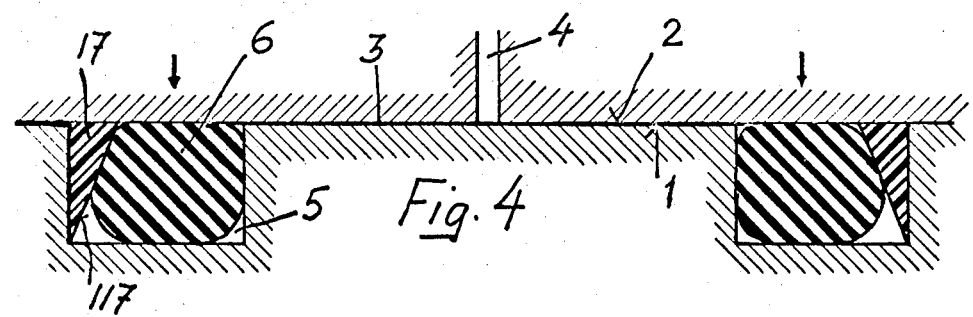

The embodiment according to FIGS. 3 and 4 differs from the embodiment of FIGS. 1 and 2 only in that the wedge-like locking element 17 has the cross-sectional shape of a right-angle triangle, the perpendicular of which bears displaceably against the outer side wall of the receiving groove 5, whereas the base faces towards the mating sealing face 2. The hypotenuse of the triangular locking element cross-section forms an oblique face 117 facing towards the sealing element 6 and co-operates therewith. The mode of operation of this embodiment is illustrated in FIG. 4, that is to say when the sealing element 6 is compressed beyond the pre-loading value by an increased mechanical thrust caused by a displacement of the mating sealing face 2 in the direction towards the sealing face 1, i.e. owing to a reduction of the width of the separating gap 3 between the two sealing faces 1, 2. In this case too, the compressed and deformed sealing element 6 presses laterally against the locking element 17 and exerts a pressure on the oblique surface 117 of the wedge-like locking element 7, so that the latter is partially pushed out of the receiving groove 5 and is pressed against the mating sealing face 2. The remaining separating gap 3 between the sealing faces 1, 2 is thereby sealed off by the locking element 17 which then prevents the sealing element 6 from being squeezed into the separating gap.

The embodiment according to FIGS. 3 and 4 operates in similar manner when the sealing element 6 is acted upon and compressed beyond a definite value exceeding the pre-loading by hydraulic or pneumatic pressure of fluid flowing in through the ingress opening 4. On the other hand, the ring seal illustrated in FIGS. 1 and 2 acts in the same manner described above, when the sealing element 6 is acted upon and compressed beyond the pre-loading value by a mechanical pressure engendered by displacement of the mating sealing face 2 in the direction towards the sealing face 1. Since the compression of the sealing element by a mechanical as well as hydraulic or pneumatic pressure implies the same mode of operation of the ring seal, the behavior of the following embodiments will be described only with reference to a mechanical compressive action stressing the sealing element beyond the pre-loading value.

In the embodiment according to FIGS. 5 and 6, the locking element 27 also has a wedge-like cross-sectional profile, but its oblique surface 127 facing towards the sealing element 16 is outwardly convex. In cross-section, the sealing element 16 is profiled to match the corresponding part of the rectangular profile of the groove and partially to match the locking element 27. In particular, the lateral face 116 of the sealing element 16 facing towards the locking element 27 is concavely formed to correspond to the convexly formed oblique surface 116 of the locking element 27 and bears against the oblique surface 116. The part of the sealing element which, in FIG. 5, projects out of the receiving groove 5 and co-operates with the mating sealing face 2 is formed with approximately semicircular convexity. When the sealing element 16 is compressively stressed and compressed beyond the preloading value, it presses the locking element 27 partially out of the receiving groove 5 owing to the co-operation of the co-ordinated curved oblique surfaces 116, 127, so far that it comes into contact with the mating sealing face 2 and closes off the separating gap 3 between the sealing faces 1, 2 as shown in FIG. 6.

In the embodiments according to FIGS. 1 to 6, the locking element 7, 17 or 27, as appropriate is formed as rigid annular unit.

In all of the embodiments illustrated, the sealing element 6 or 16, as appropriate, is clamped under slight initial pressure and is free of play between the lateral side of the receiving groove 5 and the locking element 7 or 17, as appropriate. It is possible without difficulty however to leave a limited play for motion of the sealing element between the lateral side of the receiving groove and the locking element. In the case of the ring seals between plane parallel sealing faces 1, 2 according to FIGS. 1 to 6, the locking element is situated at the external side of the sealing element since the latter is acted upon from the inside by the pressurized fluid. Ring seals may also be contemplated however, in which the sealing element is acted upon from the outside by the pressurized fluid and in which, accordingly, the locking element is situated at the inner side of the sealing element. In the case of ring seals which may be acted upon alternately on either side by the pressurized fluid through ingress openings 4, 4' (FIG. ), a locking element 7, 7' is situated at each side of the rubber-elastic sealing element 6.

I claim:

1. A ring seal arrangement for effecting a seal between two opposed plane parallel sealing faces only one of which is provided with a groove having a rectangular cross-section and having an opening facing the other, said seal arrangement comprising
   a. an annular rubber-elastic sealing element located in said groove and engaging each of the said sealing faces under an initial compressive pre-loading;
   b. at least one unsplit annular locking element made of rigid, non-deformable material also located in said groove and having a side facing the sealing element;
   c. said annular locking element having a wedge-like oblique surface formed on the side thereof facing the sealing element;
   d. the side of the locking element remote from the sealing element having a lateral surface at right angles to the parallel sealing faces displaceably arranged in contact with a side of the groove;
   e. the side of the groove which is in contact with the side of the locking element being at right angles with respect to the opposed sealing face;
   f. the height of the locking element being not greater than the depth of the groove.

2. A ring seal according to claim 1, wherein the oblique surface is a plane surface.

3. A ring seal according to claim 1, wherein the cross-section of the locking element approximates to that of a rectangular trapezium.

4. A ring seal according to claim 1, wherein the sealing element in the compressively pre-loaded condition thereof is engaged without free play between a side of the groove and the locking element.

5. A ring seal according to claim 1, wherein the sealing element is an O-section ring.

* * * * *